United States Patent [19]

Lücking et al.

[11] 3,912,604
[45] Oct. 14, 1975

[54] PROCESS FOR BROMINATING METHYLCHLOROSILANES

[75] Inventors: Hans Joachim Lücking, Bergisch-Neukirchen; Klaus Seyfried, Schildgen; Walter Noll, Opladen; Ludwig Fries, Leverkusen, all of Germany

[73] Assignee: Bayer Aktiengesellschaft, Leverkusen, Germany

[22] Filed: July 18, 1974

[21] Appl. No.: 489,680

[30] Foreign Application Priority Data

July 27, 1973 Germany.............................. 2338181

[52] U.S. Cl.......................................... 204/158 HA
[51] Int. Cl.$^2$............................................ B01J 1/10
[58] Field of Search ............................... 204/158 HA

[56] References Cited
UNITED STATES PATENTS 3,291,710   12/1966   Baniel et al. .................. 204/158 HA

FOREIGN PATENTS OR APPLICATIONS 35,258   3/1965   Germany...................... 204/158 HA Primary Examiner—Howard S. Williams
Attorney, Agent, or Firm—Burgess, Dinklage & Sprung

[57] ABSTRACT

In the production of a bromomethylmethylchlorosilane of the formula $$Br-CH_2-Si(CH_3)_nCl_{3-n}$$

in which $n$ is 1 or 2,
by reacting a methylchlorosilane of the formula $$(CH_3)_{n+1}SiCl_{3-n}$$

with bromine in the liquid phase and under the action of radiation which initiates the photochemical reaction between bromine and the methylchlorosilane, and improvement which comprises mixing the bromine with the methylchlorosilane and with chlorine in a first zone with exclusion of light which would initiate the photochemical reaction, separating any undissolved bromine and chlorine from the solution, thereafter introducing the resulting solution free of undissolved gas into a second zone separate from said first zone, and exposing said solution to radiation to initiate the photochemical reaction in said second zone.

3 Claims, 1 Drawing Figure

U.S. Patent  Oct. 14, 1975  3,912,604
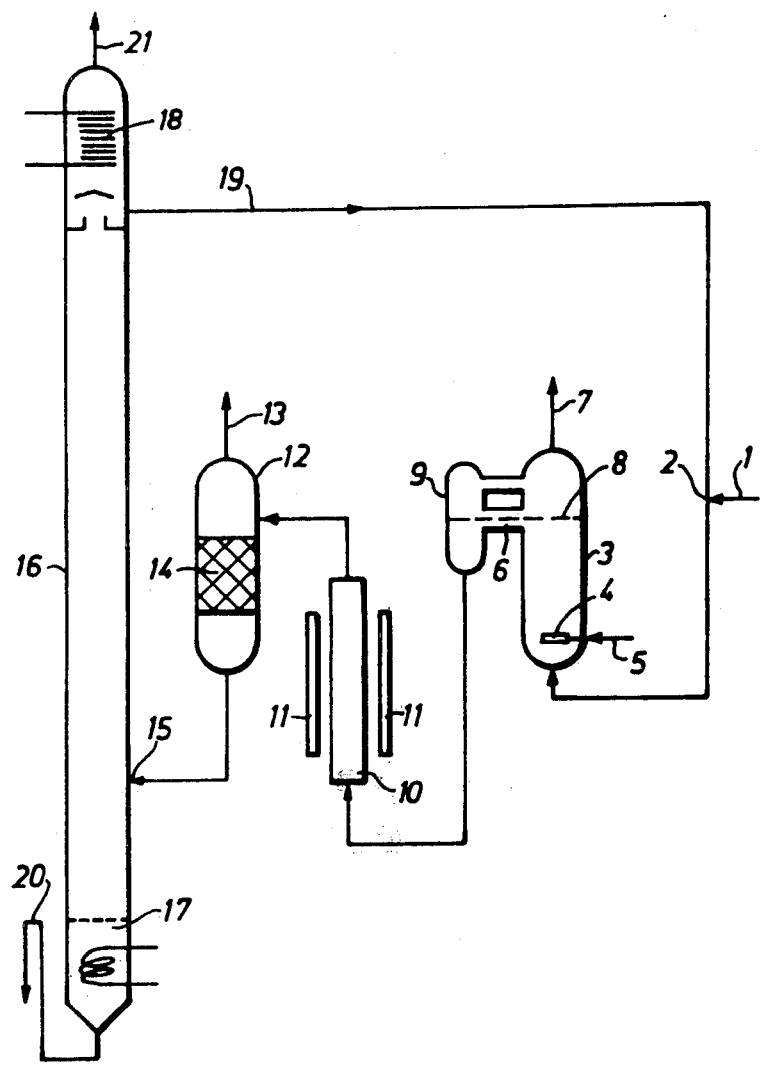

PROCESS FOR BROMINATING METHYLCHLOROSILANES

The present invention relates to a process for the preparation of bromomethylmethylchlorosilanes by reaction of methylchlorosilanes with chlorine and bromine in the liquid phase.

It is known that chloromethylmethylchlorosilanes can be prepared by reaction of methylchlorosilanes with chlorine under the action of high energy light, in the liquid and gaseous phase (compare, for example, U.S. Patent No. 2,510,149 and 2,715,134). However, these processes suffer from serious disadvantages so that they cannot be carried out economically, and above all safely, on an industrial scale. This is because, if the chlorination of the methylchlorosilanes is carried out in the gas phase by passing the gaseous methylchlorosilanes and the gaseous chlorine in a known manner into a reactor and allowing them to react therein by irradiation, for example with UV light, violent explosions can occur (compare, for example, U.S. Pat. No. 2,612,510. As experiments have shown, small quantities of air or higher local concentrations of chlorine in the gas phase cause violent explosions.

If chlorination of the methylchlorosilanes in the liquid phase is resorted to, by introducing the gaseous chlorine into the liquid methylchlorosilane in a reactor in a known manner, while irradiating the UV light, gaseous chlorine can form a gas phase of numerous individual gas bubbles in the liquid in the vicinity of the inlet point, and can pass into the gas space above the liquid methylchlorosilane, so that the possibility of an explosion in this gas phase again exists. A further disadvantage is the fact that in the vicinity of the points at which the gaseous chlorine is introduced into the liquid methylchlorosilane, local high chlorine concentrations arise in the liquid phase. These cause a relatively high proportion of more highly chlorinated, and in most cases undesired, by-products and hence a reduction of the yield of monochlorinated product.

If it is desired to brominate methylchlorosilanes by reaction with elementary bromine under UV irradiation, the bromine in general only reacts very slowly. However, the reaction velocity can be increased substantially if, prior to exposure to light, elementary chlorine is added to the mixture of bromine and methylsilanes. The more rapid conversion of the halogens is recognizable, inter alia, from the fact that the reaction mixture containing chlorine and bromine loses its color in front of the lamp much more rapidly than the mixture which only contains bromine. In general, the mixture reacts the faster, the higher is the ratio of chlorine to bromine in this mixture. Of course, in addition to the desired bromomethylmethylchlorosilanes, a corresponding proportion of chloromethylmethylchlorosilanes forms, but these can also be utilized commercially.

The present invention now relates to a process for the preparation of bromomethylmethylchlorosilanes of the general formula $$Br-CH_2-Si(CH_3)_nCl_{3-n}$$

wherein
$n$ is 1 or 2
by reaction of methylchlorosilanes of the general formula

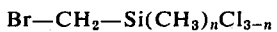

$$(CH_3)_{n+1} SiCl_{3-n}$$

with chlorine and bromine in the liquid phase and under the action of radiation which initiates the photoreaction between chlorine, bromine and methylchlorosilane. In accordance with the invention the chlorine, bromine and the appropriate methylchlorosilane are mixed in a first zone, with exclusion of light which initiates the photoreaction, any undissolved bromine and/or chlorine is separated from the solution and subsequently the resulting solution free of undissolved gas in introduced into and exposed in a second zone to radiation which initiates the photoreaction, gas being prevented from passing from the first zone into the reaction zone.

The process according to the invention has the advantage that in this simple way valuable bromomethylmethylchlorosilanes can be obtained, and surprisingly it has been found that in the halogenation of methylchlorosilanes in the liquid phase under irradiation with light the difficulties mentioned can be avoided by not feeding the chlorine and bromine directly into the reaction zone but dissolving them continuously, in the desired amount, in the liquid methylchlorosilane in a separate mixing vessel which precedes the reaction zone and passing this practically homogeneous solution of chlorine and bromine in methylchlorosilane through a reactor in such a way that complete reaction of the dissolved chlorine and bromine with the methylchlorosilane takes place in the reactor under irradiation, for example with visible or UV light. This reliably avoids an explosive gas mixture from forming in the reactor through accumulation of gaseous chlorine and bromine above or below the liquid surface. A further advantage of the process according to the invention is that as a result of feeding the homogeneous solution of chlorine and bromine in methylchlorosilanes into the reactor, high local halogen concentrations are avoided in the reaction zone and hence the proportion of more highly halogenated, mostly undesired, by-products is greatly reduced and the yield of monohalogenated product is thus increased.

Further, an additional advantage is found: if the halogen, in accordance with the invention, is not fed into the reactor but dissolved in the liquid methylchlorosilane in question in a mixing vessel preceding the reactor, and this solution is passed through a reactor in such a way that complete reaction of the dissolved halogen with the methylchlorosilane takes place in the reactor under irradiation, the process can easily be carried out in such a way that the entire hydrogen chloride or hydrogen bromide produced in the reaction is not liberated in the reactor or in the reaction zone, as in the case of the known processes, but only in a degassing vessel which follows the actual reactor, or in the subsequent distillation stage. In this way, the formation of bubbles and foam in the reactor, which are undesirable when the halogenation is carried out in the liquid phase because of the process difficulties it causes, is completely prevented so that the reactor can be designed substantially smaller and hence more economically.

The process according to the invention is in principle carried out by adding chlorine and bromine to the methylchlorosilane which is to be halogenated, in a mixing section which does not transmit light and which does not allow gas to pass over into the reactor. Here, a practically homogeneous solution of chlorine and bromine in methylchlorosilane is formed. This solution containing halogen is then introduced into a reaction vessel where the actual reaction– under the action of high energy radiation – takes place.

The reaction mixture which can essentially consist of the brominated and chlorinated methylchlorosilane, unconverted starting material and small quantities of more highly halogenated products is subjected to a process of separation - generally a distillation - in which the desired product is then obtained in a very pure form.

The starting substances employed for the process according to the invention are methylchlorosilanes of the general formula $(CH_3)_{n+1} SiCl_{3-n}$ which are prepared according to known processes.

The upper limit of the chlorine/bromine ratio is determined by the quantity of chloromethylmethylchlorosilanes still tolerated while the lower limit is determined by the rate of reaction of the bromine, which greatly decreases with decreasing chlorine content, and should preferably be so chosen that no unreacted bromine passes through the reactor. In the illustrated arrangement discussed more fully hereinbelow, this minimum chlorine/bromine ratio (molar ratio) is about 1.5, but any desired higher ratio is possible. Preferably, a molar ratio of chlorine:bromine of about 1.8 to 4 is used.

In order to obtain as homogeneous a solution as possible of the chlorine and bromine in the methylchlorosilane, the halogen is introduced into the silane in the desired amount by means of suitable devices such as, for example, gassing valves, annular bubblers or the like.

The temperature at which chlorine and bromine are added to the chlorosilanes is not particularly critical but it is advisable to work in the temperature range between about 0°C and about 50°C, preferably at room temperature, i.e. between about 15° and about 30°C.

The pressure conditions are also not critical: the process can be carried out under reduced pressure, normal pressure or super-atmospheric pressure and it is merely necessary to bear in mind the influence of pressure on the solubility of chlorine and bromine in the methylchlorosilanes used. The pressure can be different in the individual parts of the apparatus.

The process according to the invention will now be explained in more detail in a particularly advantageous embodiment to which the invention is, however, in no way restricted.

The attached FIGURE is a flow sheet of the process. In this FIGURE, 1, 2, 5, 7, 13, 15, 19, 20 and 21 denote inlet pipelines and outlet pipelines, 3 denotes a mixing vessel, 4 denotes a gassing valve, 6 denotes an overflow, 9 denotes a vessel for holding the material in quiescent state, 10 denotes a reaction vessel, 11 denotes lamps, 12 denotes a degassing vessel and 14 a packed layer, 16 denotes a distillation column, 17 denotes the sump of the distillation column and 18 denotes a condenser.

The methylchlorosilane 1 of the formula $(CH_3)_{n+1} SiCl_{3-n}$ which is to be chlorinated is fed into the system at 2. From the feed point 2 it passes from below into the mixing vessel 3 which does not transmit light and which, during operation, is filled with the methylchlorosilane up to the overflow 6. In the lower part of the mixing vessel 3, the chlorine and bromine are fed into the methylchlorosilane of the abovementioned formula at 5, in the desired amount, by means of an annular bubbler or gassing valve 4.

If less chlorine and bromine is fed into the mixing vessel than dissolves in the amount of methylchlorosilane flowing through it, the chlorine gas bubbles which issue at 4 dissolve completely in the liquid phase. During the further flow through the mixing vessel, the solution is mixed so that a homogeneous solution of chlorine and bromine in methylchlorosilane passes over at the overflow 6; the mixing can be effected by stirring, by built-in flow breakers or by packings. The homogeneous solution then passes through a vessel 9 into the reactor 10.

If, due to failure of the halogen flow regulator or through incorrect operation, more chlorine and bromine is fed in at 4, than is soluble in the amount of methylchlorosilane which flows through (which, for example in the case of the direct introduction of chlorine into the reactor, always leads to the formation of an explosive gas phase and frequently to explosions or detonations), the halogen gas bubbles break through the liquid surface 8 and can be removed safely through the pipeline 7. In this case, again, only the solution of chlorine and bromine in methylchlorosilane passes via the vessel 9 into the reactor, which can now merely contain a little more chlorine or bromine than corresponds to the optimum amount with regard to the production of more highly chlorinated by-products. Penetration of gaseous chlorine or bromine into the reactor and hence the possibility of forming an explosive gas phase are however eliminated.

The heat liberated on solution of the halogen in the methylchlorosilane can be removed through the heat exchanger (not shown in the attached FIGURE) built into the mixing vessel 3. The temperature of the solution in the mixing vessel 3 can thereby be set to a value between the melting point and the boiling point of the methylchlorosilane, preferably between about 0°C and about 50°C, more preferably at about room temperature. The amount of halogen fed into the methylchlorosilane at 4 is not subject to a lower limit, while the upper limit, at a particular pressure, is determined by the solubility of the halogen in the methylchlorosilane which is to be brominated, at the temperature to which the mixing vessel 3 is set. Preferably, the amount fed in at normal pressure is about 1 to 10 mole % of halogen, based on the amount of methylchlorosilane which goes through the mixing vessel.

The solution which has entered the reactor 10 entirely free of bubbles is therein irradiated with visible light or UV light. In the case of an entirely or partly transparent reactor, as shown in the drawing, this can be effected by lamps 11 located outside the reactor but optionally also by light sources provided inside the reactor. During the flow of the solution through the reactor, the reaction of the dissolved halogen with the methylchlorosilane now takes place under the action of light, producing the corresponding chloromethylchlorosilane, bromomethylmethylchlorosilane, hydrogen chloride and hydrogen bromide, the degassing of the hydrogen halide preferably not taking place in the reactor – as already mentioned above – when carrying out the process according to the invention, but only in the degassing vessel 12 which follows the reactor, where the degassing can be additionally assisted by the packing introduced. The hydrogen halide liberated is removed through the pipeline 13. Since the heat of reaction liberated in the reaction zone can without difficulty be removed through a heat exchanger fitted in the reactor 10 (for clarity, the heat exchanger was not shown in the drawing), the reactor can be kept at a temperature at which the occurrence of gas bubbles can be avoided reliably.

The solution leaving the degassing vessel 12 passes through an overflow at 15 to the distillation stage 16 which can be operated under normal pressure but also under superatmospheric pressure or reduced pressure. Here the unconverted methylchlorosilane is evaporated at temperatures which are above the boiling point of the non-halogenated product and below the boiling points of the halogenated products and passes, after condensation from the condenser 18, through the pipeline 19 back into the halogenation installation. Residual hydrogen halide liberated in the distillation stage is removed through the vapor pipeline 21. The chlorinated and brominated methylchlorosilane collects in the sump 17 of the distillation stage and is removed continuously through the overflow 20 while an equal amount of fresh starting product is fed to the system at 2.

The bromomethylmethylchlorosilanes obtained according to the process of the invention are valuable starting products for the synthesis of various organofunctional silanes or siloxanes (W. Noll, Chemie und Technologie der Silicone, 1968, Verlag Chemie GmbH, Weinheim/ Bergstrasse, Germany).

The examples which follow are intended to explain the process according to the invention in more detail.

EXAMPLE 1:

The installation according to the FIGURE was fed with trimethylchlorosilane and 3 mole % of chlorine and 1.5 mole % of bromine (based on the amount of silane) were metered through the annular bubbler 4 into the trimethylchlorosilane flowing through the mixing vessel 3.

The homogeneous solution underwent reaction in the reactor as described above. The temperature was 16°C at the reactor inlet and 32°C at the reactor outlet. The reaction product was separated in the distillation stage, as described. The head temperature was 58°C and the sump temperature 105°C. The product continuously withdrawn from the sump had the following composition:

| Product: | Proportion in % by weight: |
|---|---|
| $(CH_3)_3SiCl$ | 13.0 |
| $ClCH_2(CH_3)_2SiCl$ | 39.4 |
| $BrCH_2(CH_3)_2SiCl$ | 44.9 |
| Higher-boiling by-products | 2. |

EXAMPLE 2:

The installation according to the FIGURE was filled with dimethyldichlorosilane and 3.1 mole % of chlorine and 1.2 mole % of bromine (based on the amount of silane) were metered into the dimethyldichlorosilane flowing through the mixing vessel 3. The homogeneous solution underwent reaction in the reactor, the tmperature being 16°C at the reactor inlet and 32°C at the reactor outlet. The reaction product was separated by distillation, as described above. The head temperature was 70.5°C and the sump temperature 110°C. The product withdrawn from the sump at 110°C had the following composition:

| Product: | Proportion in % by weight |
|---|---|
| $(CH_3)_2SiCl_2$ | 19.6 |
| $ClCH_2(CH_3)SiCl_2$ | 40.6 |
| $BrCH_2(CH_3)SiCl_2$ | 39.0 |
| Higher-boiling by-products | 0.8 |

It will be appreciated that the instant specification and examples are set forth by way of illustration and not limitation, and that various modifications and changes may be made without departing from the spirit and scope of the present invention.

What is claimed is:

1. In the production of a bromomethylmethylchlorosilane of the formula $$Br-CH_2-Si(CH_3)_nCl_{3-n}$$

in which $n$ is 1 or 2,
by reacting a methylchlorosilane of the formula $$(CH_3)_{n+1} SiCl_{3-n}$$

with bromine in the liquid phase and under the action of radiation which initiates the photochemical reaction between bromine and the methylchlorosilane, the improvement which comprises mixing the bromine with the methylchlorosilane and with chlorine in a first zone with exclusion of light which would initiate the photochemical reaction, separating any undissolved bromine and chlorine from the solution, thereafter introducing the resulting solution free of undissolved gas into a second zone separate from said first zone, and exposing said solution to radiation to initiate the photochemical reaction in said second zone.

2. The process of claim 1 in which $n$ is 1.

3. The process of claim 1 in which $n$ is 2.

* * * * *